United States Patent
Kanno

(10) Patent No.: US 10,067,296 B2
(45) Date of Patent: Sep. 4, 2018

(54) OPTICAL CONNECTOR COMPONENT

(71) Applicant: FUJIKURA LTD., Tokyo (JP)

(72) Inventor: Shuhei Kanno, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/042,275

(22) Filed: Feb. 12, 2016

(65) Prior Publication Data
US 2016/0291259 A1   Oct. 6, 2016

(30) Foreign Application Priority Data

Mar. 30, 2015   (JP) .................... 2015-068644

(51) Int. Cl.
*G02B 6/38*   (2006.01)
*G02B 26/02*   (2006.01)
*G02B 6/42*   (2006.01)

(52) U.S. Cl.
CPC ......... *G02B 6/3814* (2013.01); *G02B 6/3825* (2013.01); *G02B 26/02* (2013.01); *G02B 2006/4297* (2013.01)

(58) Field of Classification Search
CPC .............................. G02B 6/3814; G02B 6/3849
See application file for complete search history.

(56) References Cited

U.S. PATENT DOCUMENTS

| | | | |
|---|---|---|---|
| 9,310,567 B2* | 4/2016 | Tanaka | G02B 6/3849 |
| 9,366,827 B2* | 6/2016 | Taira | G02B 6/3825 |
| 2004/0052473 A1 | 3/2004 | Seo et al. | |

FOREIGN PATENT DOCUMENTS

JP   2004-94109 A   3/2004

* cited by examiner

*Primary Examiner* — Omar R Rojas
(74) *Attorney, Agent, or Firm* — Osha Liang LLP

(57) ABSTRACT

Disclosed in an optical connector component including: a housing that accommodates an end portion of an optical transmission line; a shutter having a reflecting portion that reflects an optical signal outputted from the optical transmission line and being able to open and close inside the housing; and a light-absorbing member that is heat resistant compared to the housing and is irradiated the optical signal reflected by the reflecting portion.

6 Claims, 7 Drawing Sheets

|  | WITH/WITHOUT RESIN PLATE | INCIDENT POWER | | |
|---|---|---|---|---|
|  |  | 0.5W | 1.0W | 1.5W |
| EXAMPLES | WITH | EXCELLENT | EXCELLENT | FAIR |
| COMPARATIVE EXAMPLES | WITHOUT | POOR | POOR | POOR |

FIG. 5

OPTICAL CONNECTOR COMPONENT

CROSS-REFERENCE TO RELATED APPLICATION

The present application claims the benefit of priority pursuant to 35 U.S.C. § 119(a) to Japanese Patent Application No. 2015-68644, filed on Mar. 30, 2015, the entire disclosure of which is hereby incorporated herein by reference.

BACKGROUND

Technical Field

Embodiments of this disclosure generally relate to an optical connector component.

Related Art

Optical signals emitted from an end portion of an optical transmission line (e.g. optical fiber) may have an effect on the human body (eyes in particular). For such reason, there has been proposed an optical connector component which has optical signals prevented from leaking outside by equipping a housing which accommodates the end portion of the optical transmission line and a shutter provided inside the housing, and shielding and reflecting the optical signal with the shutter (see for example, Japanese Patent Application Laid-open Publication No. 2004-94109).

The shutter disclosed in the publication above diffuses the reflected light, however, the section (housing) to which the reflected light is irradiated would be subjected to high temperature and thus may melt.

It is therefore an objective of the present invention to suppress the housing from being melted by the reflected light.

SUMMARY

The principal invention of the present application for solving the above problem is an optical connector component including a housing that accommodates an end portion of an optical transmission line, a shutter having a reflecting portion that reflects an optical signal outputted from the optical transmission line and being able to open and close inside the housing, and a light-absorbing member that is heat resistant compared to the housing and is irradiated the optical signal reflected by the reflecting portion.

Other features of the present invention will become apparent from the following descriptions of the present specification and of the accompanying drawings.

According to the present invention, the housing is suppressed from being melted by reflected light.

BRIEF DESCRIPTION OF THE DRAWINGS

For a more complete understanding of the present invention and the advantages thereof, reference is now made to the following description taken in conjunction with the accompanying drawings wherein:

FIG. 5 is a diagram explaining the evaluation results of examples;

DETAILED DESCRIPTION

At least the following details will become apparent from the description of this specification and of the accompanying drawings.

An optical connector component including a housing that accommodates an end portion of an optical transmission line, a shutter having a reflecting portion that reflects an optical signal outputted from the optical transmission line and being able to open and close inside the housing, and a light-absorbing member that is heat resistant compared to the housing and is irradiated the optical signal reflected by the reflecting portion will be made apparent.

According to such an optical connector component, reflected light is irradiated on a light-absorbing member so that the housing is suppressed from being melted by the reflected light.

It is preferable that the shutter has a deformed portion that deforms to open and close the reflecting portion and a securing portion that secures the reflecting portion, and the light-absorbing member is arranged such as to cover the securing portion. Hereby, the light-absorbing member can continue to absorb the reflected light even when the deformed portion gradually deforms by repeating attachment and detachment of the optical connector. Additionally, the length of the securing portion can be elongated to ease securing of the shutter.

It is preferable that the light-absorbing member has an accommodating portion that accommodates the securing portion and the housing can have mounted the light-absorbing member in a state accommodating the securing portion in the accommodating portion. Hereby, mounting work inside the narrow housing can be performed in a single process.

It is preferable that the securing portion accommodated in the accommodating portion does not to come into contact with an inner wall face of the housing. Hereby, when the temperature of the light-absorbing member becomes high, the shutter can release heat while suppressing heat transfer to the housing.

It is preferable that the housing can have attached or detached the light-absorbing member. Hereby, even when the light-absorbing member deteriorates by the reflected light, the deteriorated light-absorbing member can be changed.

The housing may be a receptacle that accommodates a receptacle side optical connector on one side while allowing attachment or detachment of a plug side optical connector on another side.

The housing may be an adapter that can have attached or detached optical connectors from both sides.

===First Embodiment===

Figure 1:
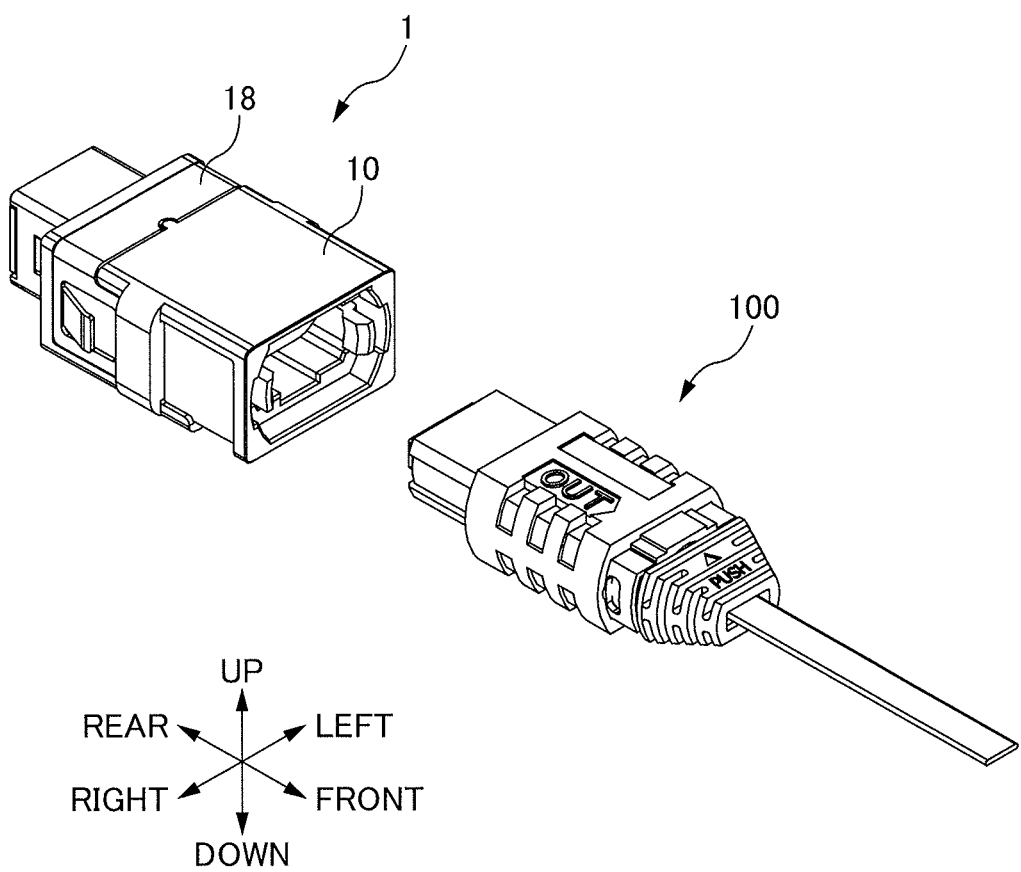
FIG. 1 is a perspective view of the optical connector component 1 according to the first embodiment of the present invention and a plug side optical connector 100 seen from above.
Figure 2:
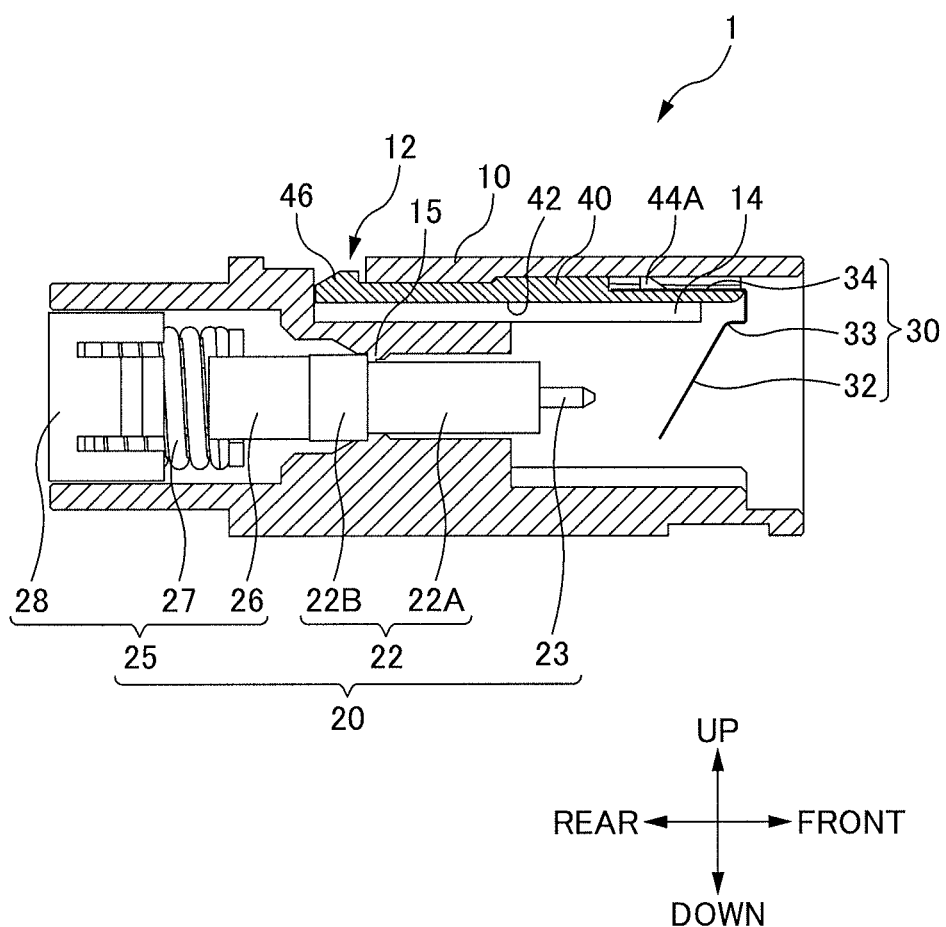
FIG. 2 is a sectional view of the optical connector component 1.
Figure 3:
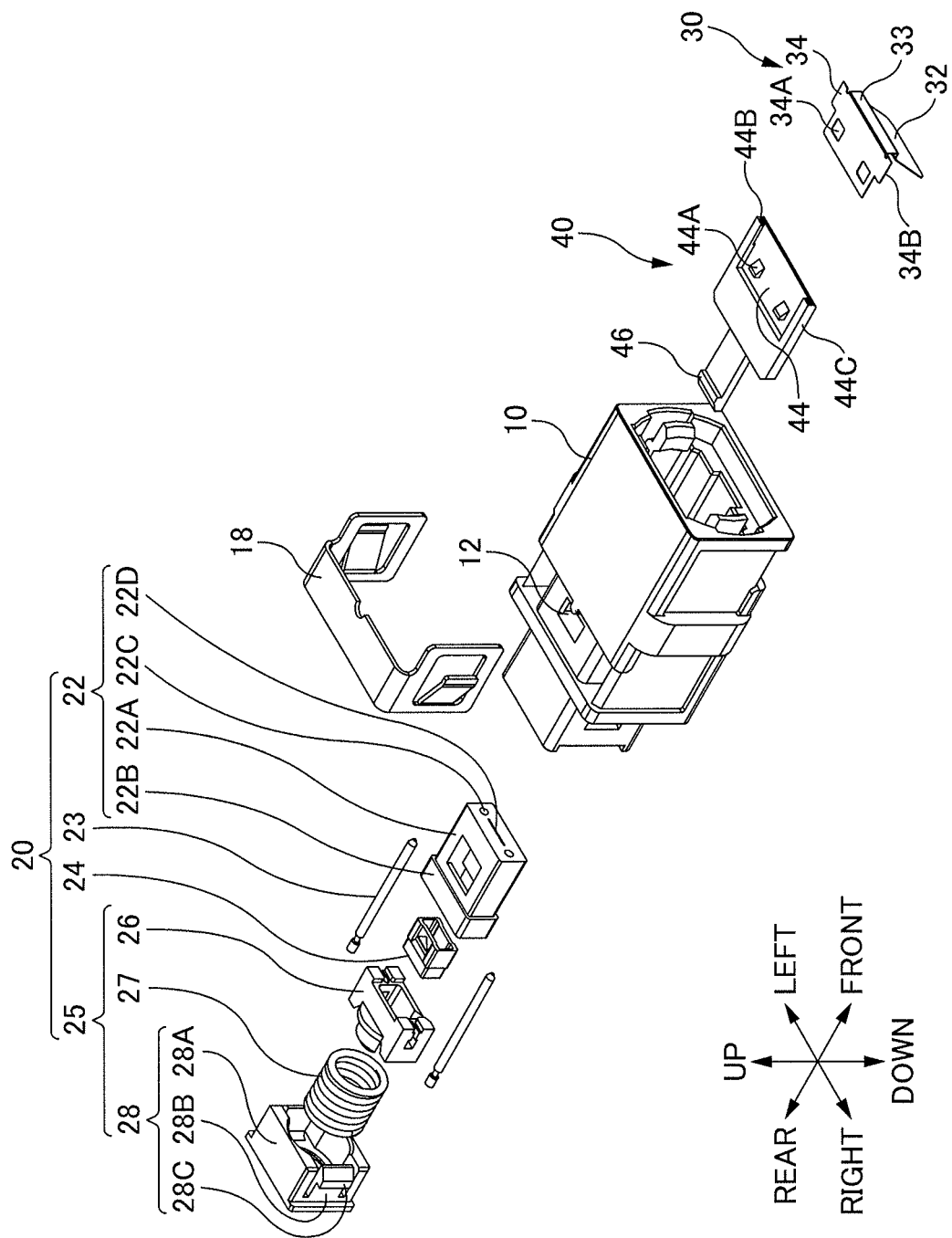
FIG. 3 is an exploded view showing the configuration of the optical connector component 1.
Figure 4A:
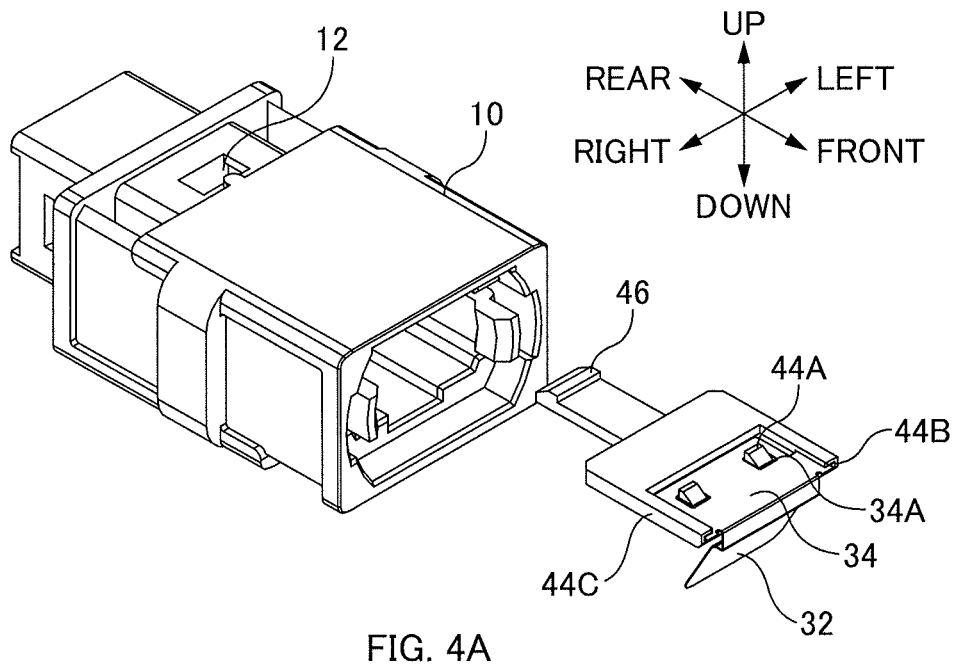
FIG. 4A and FIG. 4B are explanatory diagrams illustrating an assembly of the optical connector component 1.
Figure 4B:
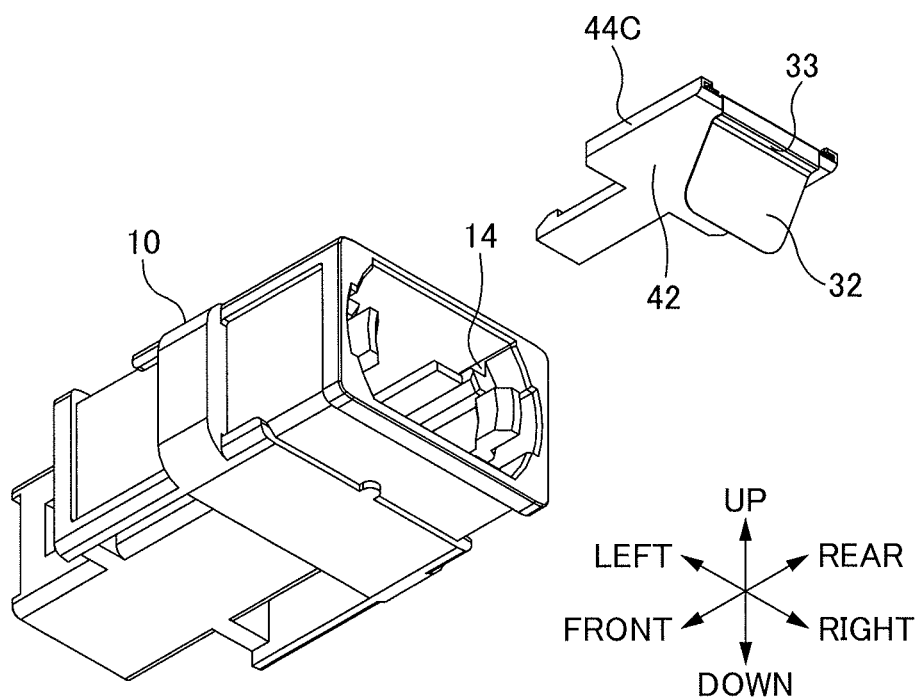

FIG. 1 is a perspective view of the optical connector component 1 according to the first embodiment and a plug side optical connector 100 seen from above. FIG. 2 is a sectional view of the optical connector component 1 and FIG. 3 is an exploded view showing the configuration of the optical connector component 1. Additionally, FIGS. 4A and 4B are explanatory diagrams illustrating the assembly of the optical connector component 1.

The directions as shown in the figures will be defined in the following description. To be specific, the direction in which the plug side optical connector 100 is attached to and detached from the optical connector component 1 is defined as the "front-rear direction" and the side of the optical connector component 1 which opposes the plug side optical connector 100 is defined as the "front" and the opposite side thereof the "rear". Additionally, the width direction (the direction in which a plurality of optical fibers are aligned) of the plug side optical connector 100 is defined as the "right-left direction". Further, the direction perpendicular to the front-rear direction as well as the right-left direction is defined as the "up-down direction".

The optical connector component 1 according to the first embodiment is a receptacle equipped with an optical connector which can have attached or detached the plug side optical connector 100. The optical connector component 1 according to the first embodiment includes a housing (receptacle) 10, a metal clip 18, a receptacle side optical connector 20, a shutter 30 and an absorbing plate 40 (corresponding to the light-absorbing member.)

The housing 10 is a tubular member and accommodates the end portion of the optical connector which becomes an optical transmission line. An accommodating portion which accommodates the later described receptacle side optical connector 20 is provided on the rear side of the housing 10 and an accommodating portion which detachably accommodates the plug side optical connector 100 (MPO connector) is provided on the front side of the housing 10. The accommodating portion of the plug side optical connector 100 has accommodated therein a later described shutter 30 and a later described absorbing plate 40. Additionally, the housing 10 is provided with an engagement hole 12 and a later described rail portion 14. The engagement hole 12 is a section (hole) which engages with the latch portion 46 of the absorbing plate 40 and is provided to the upper face of the housing 10.

The metal clip 18 is for mounting the housing 10 to the non-illustrated base plate. Further, the metal clip 18 is arranged on the engagement hole 12 of the housing 10 and also has a function of being capable of covering (hiding) the blue absorbing plate 40 (latch portion 46).

The receptacle side optical connector 20 includes a ferrule 22, guide pins 23, a boot 24 and a floating mechanism 25.

The ferrule 22 is a member that holds the end portion of the optical fiber being the optical transmission line and is integrally formed with resin. The front side endface of the ferrule 22 becomes the connecting endface which connects to the other optical connector (the plug side optical connector 100 in this case). The ferrule 22 includes a main body portion 22A and a brim portion 22B. Further, the main body portion 22A is provided with two guide holes 22C and a plurality of optical fiber holes 22D. The end portions of the plurality of optical fibers are made to be held inside the main body portion 22A.

The brim portion 22B protrudes to the outer side from the outer circumference of the main body portion 22A and contacts or abuts against the projection formed to the inner wall of the housing 10.

The guide holes 22C are holes for having the guide pins 23 inserted. The guide holes 22C penetrate in the front-rear direction the main body portion 22A and the front side endface of the ferrule 22 has two guide holes 22C opened thereto. The two guide holes 22C are formed along the right-left direction with an interval threrebetween in a manner sandwiching the plurality of the optical fiber holes 22D.

The optical fiber holes 22D are holes which have the optical fibers inserted for positioning. The optical fiber holes 22D would have inserted bare fiber having the coatings stripped off from the optical fiber core wire. Further, the plurality of optical fiber holes 22D are aligned in the in right-left direction and each of the optical fiber holes 22D run parallel in the front-rear direction. In other words, the plurality of optical fiber holes 22D which are parallel to each other are aligned in the right-left direction. Additionally, the front side endface of the ferrule 22 has the optical fiber endfaces exposed from the optical fiber holes 22D.

The guide pins 23 are for positioning the ferrule 22 and the ferrule of another optical connector (the plug side optical connector 100 in this case.) The guide pins 23 are inserted into the guide holes 22C of the ferrule 22 to penetrate in the front-rear direction the main body portion 22A of the ferrule 22. Additionally, as shown in FIG. 2, the tip ends (i.e., front side end) of the guide pins 23 protrude out from the front side endface of the ferrule 22.

The boot 24 is a member for making the bending of the optical fibers gentle. The boot 24 is preferably configured with a flexible material such as rubber, elastomer and the like, however, the boot 24 may be configured with a material having low flexibility such as resin and metal. The boot 24 as a result of making the bending of the optical fibers gentle reduces the optical transmission loss and also protects the optical fibers.

The floating mechanism 25 is a mechanism for pressing forward the ferrule 22 while allowing a rearward movement of the ferrule 22. The floating mechanism 25 includes a pin clamp 26, a spring 27 and a spring push 28.

The pin clamp 26 is for clamping and holding the guide pins 23. The flanges of the guide pins 23 are arranged in a manner sandwiched between the rear side endface of the ferrule 22 and the front side endface of the pin clamp 26 thereby preventing the guide pins 23 from falling out in the front-rear direction.

The spring 27 imparts a forward force against the ferrule 22 through the pin clamp 26 with the repulsion of this spring 27. A brim portion 22B is formed to the rear side of the ferrule 22 in a manner having the outer circumference protruding outward so that when the front side endface of the brim portion 22B contacts the projecting portion 15 (see FIG. 2) formed to the inner face of the housing 10, the ferrule 22 is restricted from moving further forward (i.e., the ferrule 22 is restricted from falling out forward.)

The spring push 28 is a member for accommodating the spring 27 in the housing 10 in an elastically deformed (compressed) state. Hereby, the ferrule 22 is imparted a forward force with the repulsion of the spring 27 while being accommodated in the housing 10 in a rearward movable manner. By accommodating the ferrule 22 in this way, the endfaces of the ferrules can be maintained in a state physically coming against each other under a predetermined force when the plug side optical connector 100 is connected.

Further, the spring push 28 includes a frame-like main body 28A and a pair of fitting wall projections 28B. The frame-like main body 28A has formed a fiber insert hole for inserting optical fiber. The pair of fitting wall projections 28B are sections formed to protrude out toward the front side from both the right and left sides of the frame-like main body 28A. The pair of the fitting wall projections 28B has formed thereto outward protruding engaging claws 28C so that the spring push 28 is secured to the housing 10 by the engaging claws 28C being fit into the engaging holes (not shown) formed on the inner face of the housing 10. Here, the spring 27 is accommodated between the pin clamp 26 and the spring push 28 in a compressively deformed state, however, the spring push 28 is prevented from falling out to the rear side of the housing 10 by the engaging claws 28C being fit into the engaging holes of the housing 10.

The shutter 30 is for shielding and reflecting the optical signal exited from the optical fiber of the receptacle side optical connector 20 to suppress harm to the eyes by light (eye safe) when the plug side optical connector 100 is not accommodated in the housing 10. Further, the shutter 30 has a function of opening/closing in response to the attachment/detachment of the plug side optical connector 100. Additionally, the shutter 30 has a function of protecting the receptacle side optical connector 20 from dust when the plug side optical connector 100 is not present (not accommodated in the housing 10.)

The shutter 30 is made of metal and includes a reflecting portion 32, a deformed portion 33 and a securing portion 34. The shutter 30 is a V-shaped member which is bended at the deformed portion 33.

The reflecting portion 32 is for reflecting toward a predetermined direction the light signal exiting from the optical fiber of the receptacle side optical connector 20. The reflecting portion 32, in the present embodiment, reflects the optical signal toward the lower face (absorbing face 42) of the absorbing plate 40. Here, the rear side face of the reflecting portion 32 becomes the reflecting face which reflects the optical signals. The front side face of the reflecting portion 32 becomes the contacting face which comes into contact with the plug side optical connector 100 when the plug side optical connector 100 is inserted into the housing 10.

The deformed portion 33 joins the reflecting portion 32 with the securing portion 34 and allows opening and closing of the reflecting portion 32 by deforming (elastic deformation.) The deformed portion 33 deforms when the plug side optical connector 100 is attached and when the plug side optical connector 100 is pulled out. To be specific, the deformed portion 33 deforms (upward) so that the reflecting portion 32 opens when the plug side optical connector 100 is attached and deforms (downward) so that the reflecting portion 32 closes when the plug side optical connector 100 is pulled out.

The securing portion 34 is for securing the reflecting portion 32 to the absorbing plate 40. As illustrated in FIG. 3, the securing portion 34 has engaging holes 34A and edge portions 34B.

The engaging holes 34A are sections that engage with the engaging portions 44A of the absorbing plate 40. The engaging holes 34A and the engaging portions 44A engage to secure the shutter 30 (reflecting portion 32) to the absorbing plate 40.

The edge portions 34B are sections on the right-left direction edges of the securing portion 34 and are sections which are held by the holding portions 44B of the absorbing plate 40.

The absorbing plate 40 has irradiated thereto the reflected light which has been reflected by reflecting portion 32 of the shutter 30 and absorbs this reflected light. Absorption of the reflected light in this way allows to suppress the housing 10 from being melted by the reflected light. Additionally, the absorbing plate 40 includes a function to secure the securing portion 34 of the shutter 30.

The absorbing plate 40 is made of heat-resistant resin (polyetherimide resin, for example, ULTEM 1000R manufactured by SABIC) and is more resistant to heat than the housing 10.

Further, the color of the absorbing plate 40 of the present embodiment is blue. This is for appropriately absorbing the reflected light. If the color were black, the reflected light would be excessively absorbed which may lead to the melting of the absorbing plate 40. Here, the absorbing plate 40 (latch portion 46) is covered by the metal clip 18 in order to hide the easily-noticeable blue color.

The absorbing plate 40 includes an absorbing face 42, an accommodating portion 44 and a latch portion 46.

The absorbing face 42 is the lower face of the absorbing plate 40 and is the face which has irradiated the light (optical signal) reflected by the reflecting portion 32 of the shutter 30.

The accommodating portion 44 is provided to the top face of the absorbing plate 40 and has a function to accommodate and secure the securing portion 34 of the shutter 30. In the present embodiment, the accommodating portion 44 is provided to the top face of the absorbing plate 40 so that the absorbing plate 40 can be arranged to cover the securing portion 34 of the shutter 30. Hereby, even when the deformed portion 33 were to be gradually deformed by repeating attachment and detachment of the plug side optical connector 100 and the position where the reflected light is irradiated were to gradually come close to the supporting portion of the reflecting portion 32 of the shutter 30, the absorbing plate 40 (absorbing face 42) can continue to absorb the reflected light with the absorbing plate 40 covering the securing portion 34 of the shutter 30. Additionally, the length of the securing portion 34 of the shutter 30 can be elongated to allow the shutter 30 to be easily secured since the absorbing plate 40 is covering the securing portion 34 of the shutter 30.

The accommodating portion 44 has engaging portions 44A, holding portions 44B and edge portions 44C.

The engaging portions 44A are sections which engage with the engaging holes 34A of the shutter 30. The engaging portions 44A further have a function to secure the securing portion 34 of the shutter 30 to the accommodating portion 44 the absorbing plate 40. The engaging portions 44A are provided to the accommodating portion 44 in an upward protruding manner.

The holding portions 44B are sections which sandwich in the up-down direction to hold the edge portions 34B of the shutter 30 and are formed (in depressed forms) to fit together with the edge portions 34B. A pair of the holding portions 44B is provided to the two sides in the right-left direction of the accommodating portion 44 so to correspond to the edge portions 34B at the two right-left direction edges of the shutter 30. Additionally, the holding portions 44B are provided along the front-rear direction and the securing portion 34 (edge portions 34B) of the shutter 30 is allowed to slide in the front-rear direction while being held by the holding portions 44B. The upper part of these holding portions 44B (the section which comes above the edge portions 34B of the shutter 30) are made thick so that the securing portion 34 of the shutter 30 does not contact the inner wall face of the housing 10. Hereby, heat transfer to the housing 10 is suppressed while allowing heat to dissipate easily at the shutter 30 when the absorbing face 42 of the absorbing plate 40 becomes hot.

The edge portions 44C are portions on the right-left direction edges of the absorbing face 42 of the absorbing plate 40 and are sections made to slide along the rail portion 14 of the housing 10 (see FIG. 4B.)

The latch portion 46 is a section which catches on the engagement hole 12 of the housing 10. Additionally, the latch portion 46 secures the absorbing plate 40 to the housing 10 by engaging with the engagement hole 12. The latch portion 46 is provided in a manner protruding upward (upward convex shape) at the rear end portion of the absorbing plate 40.

The rail portion 14 of the housing 10 is provided to the accommodating portion of the plug side optical connector 100 (see FIGS. 2 and 4B.) The rail portion 14 is for holding in the up-down direction the right-left edge portions 44C of the absorbing plate 40 while allowing movement of the edge portions 44C in the front-rear direction. Further, the rail portion 14 can have the absorbing plate 40 mounted thereto with the securing portion 34 of the shutter 30 accommodated in the accommodating portion 44 of the absorbing plate 40. The rail portion 14 being provided in this way allows attachment/detachment of the absorbing plate 40 to/from the housing 10. Hereby, a deteriorated absorbing plate 40 can be replaced when the absorbing plate 40 had deteriorated by the reflected light.

It should be noted that the rail portion 14 is arranged on the side opposite (upward) the keyway of the housing 10. This is because the housing 10 is thin on the keyway side.
Assembling Method Description of the assembling method of the optical connector component 1, specifically, the method of mounting the shutter 30 and the absorbing plate 40 to the housing 10 will be given in the following.

Firstly, the shutter 30 is secured to the absorbing plate 40. In other words, the edge portions 34B of the shutter 30 slide along the holding portions 44B of the absorbing plate 40. When sliding in such a manner, the engaging holes 34A of the shutter 30 engage with the engaging portions 44A of the absorbing plate 40, as illustrated in FIG. 4A. Hereby, the securing portion 34 of the shutter 30 is secured to the accommodating portion 44 of the absorbing plate 40. That is, the shutter 30 (reflecting portion 32) is secured to the absorbing plate 40.

Next, the absorbing plate 40 which has been secured to the shutter 30 is secured inside the housing 10. Here, the edge portions 44C of the absorbing plate 40 slide along the rail portion 14 of the housing 10 (see FIGS. 4A and 4B.) When sliding in such a manner, the latch portion 46 of the absorbing plate 40 catches on the engagement hole 12 of the housing 10 (see FIG. 2.) Hereby, the absorbing plate 40 is secured to the housing 10. Further, since the shutter 30 is secured to the absorbing plate 40, the shutter 30 is secured to the housing 10.

As explained above, in the present embodiment, since the absorbing plate 40 having the shutter 30 secured thereto in advance is mounted inside the housing 10, the mounting work inside the narrow housing 10 can be completed in a single process.
Movement of the Optical Connector Component 1

The housing of the plug side optical connector 100 comes into contact with the shutter 30 when the plug side optical connector 100 is inserted (i.e., accommodated) into the housing 10 of the optical connector component 1. Hereby, the deformed portion 33 of the shutter 30 deforms to open (move upward) the reflecting portion 32. And thus the endfaces (endfaces of the optical fibers) of the plug side optical connector 100 and the receptacle side optical connecter 20 are (optically) connected.

When the plug side optical connector 100 is pulled out from the housing 10, the deformed portion 33 is urged to come back to its original position so to close (move downward) the reflecting portion 32 of the shutter 30. Therefore, the optical signals exited from the optical fibers of the receptacle side optical connecter 20 are reflected by the reflecting portion 32 to be irradiated to the absorbing face 42 of the absorbing plate 40. Therefore, the optical signals can be shielded so that harm to the eyes by the optical signals can be suppressed (eye safe.) Further, the absorbing plate 40 absorbs the reflected light and is heat resistant compared to the housing 10 so that the housing 10 being melted by the irradiation of the reflected light can be suppressed.

EXAMPLES

The optical connector component 1 according to the first embodiment had been created to evaluate the effects by the reflected light. Comparative examples without the (heat-resistant resin) absorbing plates 40 were employed. In the comparative examples, the reflected light had been irradiated to the housing.

FIG. 5 is a diagram explaining the evaluation results of the examples.

The evaluation results are indicated as poor where the housing had melted, fair where the housing had started to melt, and excellent where the housing did not melt.

As shown in the diagram, the housings of the comparative examples had melted in all incident power cases. On the other hand, the housing did not melt with the examples where the incident powers were 0.5 W and 1.0 W but the housing had started to melt with the example where the incident power was 1.5 W.

As can be seen from above, it was confirmed that the housing being melted by the reflected light can be suppressed in the examples.

As described above, the optical connector component 1 according to the present embodiment includes a housing 10 which accommodates the receptacle side optical connecter 20 (end portion of the optical transmission line), a shutter 30 having the reflecting portion 32 which reflects the optical signals outputted from the optical fibers and being allowed to open and close in the housing 10, and an absorbing plate 40 (absorbing face 42) which is heat resistant compared to the housing 10 and to which light reflected by the reflecting portion 32 is irradiated. Hereby, since the absorbing plate 40 absorbs the reflected light and is much heat resistant compared to the housing 10, the housing 10 can be suppressed from being melted by the irradiation of the reflected light.

Further, the shutter 30 has the deformed portion 33 which opens and closes the reflecting portion 32 and the securing portion 34 which secures the reflecting portion 32, and the light-absorbing member 40 is arranged so to cover the securing portion 34. Hereby, even when the deformed portion 33 were to gradually deform by repeating attachment and detachment of the plug side optical connector 100 the absorbing plate 40 can continue to absorb the reflected light. Further, the length of the securing portion 34 of the shutter 30 can be elongated to allow easy securing of the shutter 30.
===Second Embodiment===

The optical connector component according to the second embodiment differs from the first embodiment in that the component is an adapter.

Figure 6:
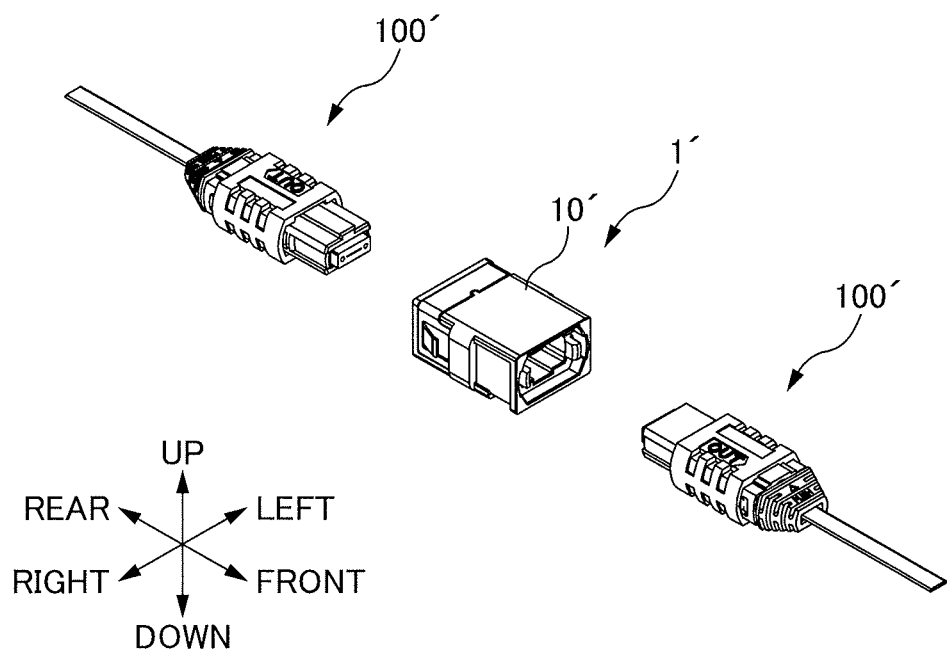
FIG. 6 is an explanatory diagram illustrating an optical connector component 1' according to the second embodiment of the present invention.
Figure 7:
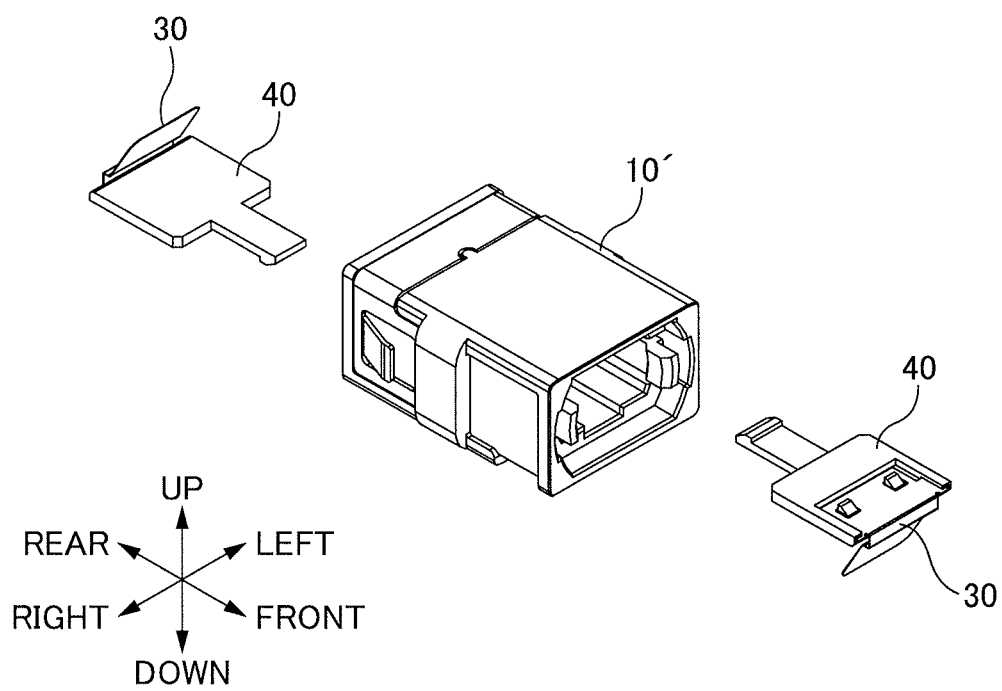
FIG. 7 is an explanatory diagram illustrating the configuration of the optical connector component 1' according to the second embodiment.

FIG. 6 is an explanatory diagram illustrating an optical connector component 1' according to the second embodiment. And FIG. 7 is an explanatory diagram illustrating the way in which the shutter 30 and the absorbing plate 40 are mounted to the optical connector component 1' according to the second embodiment. The optical connector component 1' according to the second embodiment is an optical connector adapter which allows attachment and detachment of the optical connecters from both sides.

The housing (adapter) 10' of the optical connector component 1' according to the second embodiment is provided with accommodating portions which detachably accommodate the optical connectors 100' (MPO connectors) on the two sides in the front-rear direction. Here, the optical connector 100' is similar to the plug side optical connector 100 according to the first embodiment. And with the optical connector component 1' according to the second embodiment, the structures of the front side and the rear side accommodating portions of the housing 10' are arranged vertically opposite in order to minimize the dimensions. In other words, as illustrated in FIG. 6, an optical connector 100' and the other optical connector 100' are accommodated in the housing 10' vertically opposite each other.

Further, as illustrated in FIG. 7, each accommodating portion on the front side and the rear side of the housing 10' have a shutter 30 and an absorbing plate 40 accommodated therein. Here, the absorbing plate 40 having the shutter 30 secured thereto is mounted (vertically opposite) to each accommodating portion of the housing 10'. However, it is not limited to such and the shutter 30 and the absorbing plate 40 may be accommodated in only one of the accommodating portions. In this case, when the optical connector 100' is accommodated in one side of the housing 10', the optical connector 100' just has to be accommodated in the accommodating portion on the side where the optical signal is shielded and reflected by the shutter 30.

In also this second embodiment, harm to the eyes by the optical signals exited from the optical connector 100' can be suppressed (eye safe) and since reflected light is irradiated to the absorbing plate 40, the housing 10' is also suppressed from being melted by the reflected light.

===Others===

The above described embodiments are simply for facilitating the understanding of the present invention and are not in any way to be construed as limiting the present invention. Needless to say, the present invention may variously be changed or altered without departing from its spirit and encompass equivalents thereof.

The material and color of the absorbing plate 40 is not limited to those described in the above embodiment. For example, the color of the absorbing plate 40 in the aforementioned embodiment was blue, however, it may be any color as long as it is a color which appropriately absorbs reflected light. For example, the color may be red.

What is claimed is:

1. An optical connector component, comprising:
a housing that accommodates an end portion of an optical transmission line;
a shutter having a reflecting portion that reflects an optical signal outputted from the optical transmission line and being able to open and close inside the housing; and
a light-absorbing member that is heat resistant compared to the housing and is irradiated by the optical signal reflected by the reflecting portion, wherein
the shutter has a deformed portion that deforms to open and close the reflecting portion and a securing portion that secures the reflecting portion to the light-absorbing member that is attached to the housing so that the securing portion does not contact the housing,
the securing portion comprises inner and outer surfaces such that at least one engaging hole passes through the inner and outer surfaces, and
the light-absorbing member is arranged such as to cover the securing portion.

2. The optical connector component according to claim 1, wherein
the light-absorbing member has an accommodating portion that accommodates the securing portion and
the housing can have mounted the light-absorbing member in a state accommodating the securing portion in the accommodating portion.

3. The optical connector component according to claim 2, wherein the securing portion accommodated in the accommodating portion does not come into contact with an inner wall face of the housing.

4. The optical connector component according to claim 1, wherein the housing can have attached or detached the light-absorbing member.

5. The optical connector component according to claim 1, wherein the housing is a receptacle that accommodates a receptacle side optical connector on one side while allowing attachment or detachment of a plug side optical connector on another side.

6. The optical connector component according to claim 1, wherein the housing is an adapter that can have attached or detached optical connectors from both sides.

* * * * *